United States Patent Office 3,184,450
Patented May 18, 1965

3,184,450
11β,12β-OXIDO-14α-HYDROXY-
Δ⁴-PREGNENES
Patrick A. Diassi, Westfield, and Allen I. Laskin, Somerset, N.J., assignors to Olin Mathieson Chemical Corporation, New York, N.Y., a corporation of Virginia
No Drawing. Filed June 20, 1962, Ser. No. 203,736
4 Claims. (Cl. 260—239.55)

This invention relates to the synthesis of valuable steroids and has for its objects the provision of (a) new steroids which are physiologically active, and (b) an advantageous process for preparing the same.

The process of this invention initially comprises subjecting a steroid of the general formula

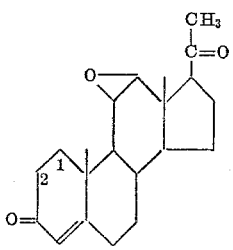

wherein the 1,2-position is saturated or double-bonded to the action of the microorganism *Wojnowicia graminis* and recovering the steroids of the general formula

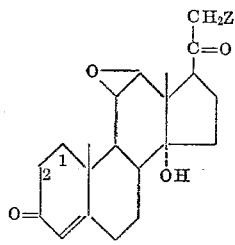

wherein the 1,2-position is saturated or double-bonded and Z is hydrogen or hydroxy, obtained thereby.

If desired these steroids, wherein Z is hydroxy, can then be esterified by treatment with the acyl halide or acid anhydride of the desired acid to yield ester derivatives of this invention. Although any acyl halide or acid anhydride may be used, the preferred esterifying reagents are those of hydrocarbon carboxylic acids of less than twelve carbon atoms, as exemplified by the lower alkanoic acids (e.g., acetic, propionic, butyric, pentanoic, hexanoic and octanoic acid), the monocyclic aromatic carboxylic acids (e.g., benzoic and p-toluic acid), the monocyclic aromatic lower alkanoic acids (e.g., phenacetic and β-phenylpropionic acid), the monocyclic cycloalkanecarboxylic acids, the monocyclic cycloalkenecarboxylic acids and the lower alkenoic acids. The reaction is preferably conducted in the presence of an organic base, such as pyridine, and results in the preparation of the corresponding 21-mono ester of the starting steroid reactant.

The final products of this invention can, therefore, be represented by the general formula

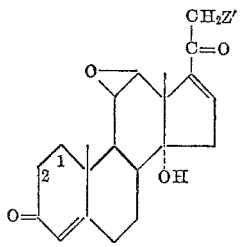

wherein the 1,2-position is saturated or double-bonded, Z' is hydrogen, hydroxy or the acyloxy radical of a hydrocarbon carboxylic acid of less than twelve carbon atoms. These final products, wherein Z' is hydroxy or acyloxy, are physiologically active substances which possess mineralocorticoid activity and hence can be used in lieu of known mineralocorticoids in the treatment of conditions requiring such active substances. These final products, wherein Z' is hydrogen, are physiologically active substances which possess progestational activity and hence can be used in lieu of known progestational agents, such as progesterone, in the treatment of conditions requiring such active substances.

The following examples illustrate the invention (all temperatures being in centigrade):

EXAMPLE 1

*11β,12β-oxido-Δ¹,⁴-pregnadiene-3,20-dione*

To a solution of 1.0 g. of 11β,12β-oxidoprogesterone in 50 ml. of purified dioxane, 700 mg. of 2,3-dichloro-5,6-dicyanobenzoquinone is added and the resulting solution is refluxed under nitrogen for six hours. After cooling the precipitated 2,3-dichloro-5,6-dicyanohydroquinone is filtered and washed with dioxane. The combined filtrate and washings are diluted with an equal volume of chloroform and adsorbed onto 40 g. of Woelm neutral alumina. Elution with chloroform and crystallization of the residue of the eluates from acetone-hexane gives 11β,12β-oxido-Δ¹,⁴-pregnadiene-3,20-dione.

EXAMPLE 2

*11β,12β-oxido-14α-hydroxydesoxycorticosterone and 11β,12β-oxido-14α-hydroxyprogesterone*

Surface growth from each of two three-week old agar slant cultures of *Wojnowicia graminis* NRRL 2472, the slant containing as a nutrient medium (A): glucose, 10 g.; Difco yeast extract, 2.5 g.; $K_2HPO_4$, 1 g.; agar, 20 g.; and distilled water to 1 l.; are suspended in 2.5 ml. of an 0.01% sodium lauryl sulfate aqueous solution. One milliliter portions of the suspension are used to inoculate four 250 ml. conical flasks, each containing 50 ml. of the following sterilized nutrient medium (B): dextrose, 10 g. cornsteep liquor, 6 g.; $NH_4H_2PO_4$, 3 g.; Difco yeast extract, 2.5 g.; $CaCl_3$, 2.5 g.; and distilled water to 1 l. After four days incubation at 25° with continuous rotary agitation (280 cycles per minute, 2 inch radius), 10% (vol./vol.) transfers are made to twenty 250 ml. conical flasks each containing 50 ml. of fresh sterilized medium B. After an additional incubation period of three days, 10% transfers from these flasks are made to two hundred 250 ml. conical flasks each containing 50 ml. of fresh sterilized medium B. The steroid is added by adding to each flask 0.25 ml. of a sterile solution of 11β,12β-oxidoprogesterone in N,N-dimethylformamide (60 mg./ml.) so that the medium is supplemented with 300 μg./ml. of steroid. After 48 hours of further incubation, the contents of the flasks are pooled and filtered through a Seitz clarifying pad. The flasks, mycelium and pad are washed with successive 50 ml. portions of warm water. The combined filtrate and washings have a volume of eleven liters. This is extracted with three 3.3 l. portions of chloroform which are combined, washed twice with 5 l. portions of water and evaporated to dryness in vacuo. The residue (2.3 g.) on crystallization from acetonehexane gives a precipitate of 11β,12β- oxidodesoxycorticosterone and an acetone-hexane mother liquor. The mother liquor is evaporated to dryness in vacuo to yield a mother liquor residue which is dissolved in benzene and chromatographed on Florisil (trademark of the Floridin Co., Tallahassee, Florida, for a magnesium silicate). Elution with chloroformbenzene gives on evaporation of the solvent and crystallization of the residue from acetone-hexane 11β,12β-oxido-14α-hydroxyprogesterone, having a M.P. of about 218–220°; $[\alpha]_D^{22}$ +221° (chlf.);

$\lambda_{max.}^{alc.}$ 239 mμ(ε=16,600); $\lambda_{max.}^{Nujol}$ 2.99, 5.90, 6.07, 6.20μ

*Analysis.*—Calcd. for $C_{21}H_{28}O_4$ (344.44). C, 73.22; H, 8.19. Found: C, 73.40; H, 8.02.

Elution of the column with acetone-chloroform (1:1) gives 11β,12β-oxido-6β-hydroxydesoxycorticosterone.

Further elution with acetone gives on crystallization 11β,12β-oxido-14α-hydroxydesoxycorticosterone, having a M.P. of about 219–221°; $[\alpha]_D^{22}$ +209° (chlf.);

$\lambda_{max.}^{alc.}$ 238 mμ(ε=18,000); $\lambda_{max.}^{Nujol}$ 2.86, 5.88, 6.02, 6.19μ

*Analysis.*—Found: C, 70.15; H, 7.98.

EXAMPLE 3

*11β,12β - oxido - $\Delta^{1,4}$-pregnadiene-14α,21-diol-3,20-dione and 11β,12β-oxido-$\Delta^{1,4}$-pregnadiene-14α-ol-3,20-dione*

Following the procedure of Example 2, but substituting 11β,12β-oxido-$\Delta^{1,4}$-pregnadiene-3,20-dione for the 11β,12β-oxidoprogesterone in the fermentation there is obtained 11β,12β - oxido-$\Delta^{1,4}$-pregnadiene-14α21-diol-3,20-dione and 11β,12β - oxido-$\Delta^{1,4}$-pregnadiene-14α-ol-3,20-dione.

EXAMPLE 4

*11β,12β-oxido-14α-hydroxydesoxycorticosterone 21-acetate*

A solution of 100 mg. of 11β,12β-oxido-14α-hydroxydesoxycorticosterone in 3 ml. of dry pyridine and 1 ml. of acetic anhydride is left at room temperature for 16 hours, then diluted with water and extracted with chloroform. The chloroform is washed successively with 2 N HCl, 5% NaHCO₃ and water and then evaporated to dryness in vacuo. Crystallization of the residue from acetone-hexane gives 11β,12β-oxido-14α-hydroxydesoxycorticosterone 21-acetate having M.P. about 208–210°; $[\alpha]_D^{22}$ +210°;

$\lambda_{max.}^{alc.}$ 238 mμ(ε=17,200); $\lambda_{max.}^{Nujol}$ 2.92, 5.72, 5.82, 6.03, 6.21μ

*Analysis.*—Calcd. for $C_{23}H_{30}O_6$ (402.47): C, 68.63; H, 7.51. Found: C, 68.60; H, 7.46.

In a similar manner, by substituting other acylating agents for the acetic anhydride in the procedure of Example 4, corresponding ester derivatives are obtained. Thus, propionic anhydride and benzoyl chloride yield their respective propionate and benzoate ester derivatives.

The invention may be variously otherwise embodied within the scope of the appended claims.

What is claimed is:

1. A compound selected from the group consisting of steroids of the formula

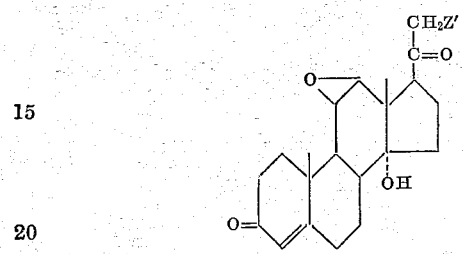

and the 1,2-dehydro derivatives thereof, wherein Z' is selected from the group consisting of hydrogen, hydroxy and the acyloxy radical of a hydrocarbon carboxylic acid of less than twelve carbon atoms.

2. 11β,12β-oxido-14α-hydroxydesoxycorticosterone.

3. 11β,12β-oxido-14α-hydroxydesoxycorticosterone 21-acetate.

4. 11β,12β-oxido-14α-hydroxyprogesterone.

References Cited by the Examiner

UNITED STATES PATENTS

| | | | |
|---|---|---|---|
| 2,748,149 | 5/56 | Reichstein | 260—397.1 |
| 2,756,179 | 7/56 | Fried et al. | 195—51 |
| 2,830,935 | 4/58 | Shull | 195—51 |
| 2,922,798 | 1/60 | Wettstein et al. | 260—397.45 |
| 2,930,791 | 3/60 | Meister et al. | 260—239.57 |
| 2,932,639 | 4/60 | Oliveto et al. | 260—239.55 |
| 2,951,840 | 9/60 | Ringold et al. | 260—239.55 |

LEWIS GOTTS, *Primary Examiner.*